Sept. 10, 1957 R. S. VANIMAN 2,806,090

CORDLESS ATTENDANT'S CABINET WITH CALL INTERCEPTION

Filed Dec. 30, 1953 6 Sheets-Sheet 1

INVENTOR.
ROBERT S. VANIMAN
BY Wm. Walter Owen,
ATTY.

Sept. 10, 1957 R. S. VANIMAN 2,806,090

CORDLESS ATTENDANT'S CABINET WITH CALL INTERCEPTION

Filed Dec. 30, 1953 6 Sheets-Sheet 2

FIG. 2 INCOMING TRUNK & INTERCEPT CKT. 200

INVENTOR.
ROBERT S. VANIMAN
BY Wm. Walter Owen.
ATTY.

CORDLESS ATTENDANT'S CABINET WITH CALL INTERCEPTION

Filed Dec. 30, 1953 6 Sheets-Sheet 3

INVENTOR.
ROBERT S. VANIMAN
BY Wm. Walter Dean
ATTY.

Sept. 10, 1957 R. S. VANIMAN 2,806,090

CORDLESS ATTENDANT'S CABINET WITH CALL INTERCEPTION

Filed Dec. 30, 1953 6 Sheets-Sheet 4

FIG4 INFORMATION & LINE EQUIPMENT TRUNK 400

INVENTOR.
ROBERT S. VANIMAN

BY Wm. Walter Owen.

ATTY.

Sept. 10, 1957 R. S. VANIMAN 2,806,090

CORDLESS ATTENDANT'S CABINET WITH CALL INTERCEPTION

Filed Dec. 30, 1953 6 Sheets-Sheet 5

INVENTOR.
ROBERT S. VANIMAN
BY Wm. Walter Owen
ATTY.

CORDLESS ATTENDANT'S CABINET WITH CALL INTERCEPTION

Filed Dec. 30, 1953 6 Sheets-Sheet 6

INVENTOR.
ROBERT S. VANIMAN
BY Mc Walter Owen
ATTY.

United States Patent Office 2,806,090

Patented Sept. 10, 1957

2,806,090

CORDLESS ATTENDANT'S CABINET WITH CALL INTERCEPTION

Robert S. Vaniman, Chicago, Ill., assignor to General Telephone Laboratories, Incorporated, a corporation of Delaware Application December 30, 1953, Serial No. 401,184

14 Claims. (Cl. 179—27)

The present invention relates to telephone systems and more particularly to circuit improvements in an attendant's cabine for use in a private automatic branch exchange system of the type having access over trunk lines to one or more central office exchanges. The attendant's cabinet and associated equipment are arranged so that calls from a central office to a private automatic branch exchange subscriber may be completed without the aid of an attendant. The equipment is further arranged to allow the attendant to intercept incoming calls from a central office on operation of an intercept key without interfering with a call already in progress, or on the calling central office subscriber dialling a predetermined number. Thereafter the call is extended by the attendant. On calls initiated by a private automatic branch exchange subscriber, the system provides automatic extension of the connection to another private automatic branch exchange subscriber and interception by the exchange attendant on calls to the central office. The latter type of call may be completed to the central office directly or on a time delay basis by the attendant. Release of connections established through the attendant's position may be accomplished automatically thus minimizing the problem of undue tieup of equipment due to the attendant's failure to release the connection.

Private automatic branch exchange systems (hereinafter abbreviated P. A. B. X) for providing any of the aforementioned types of services, have inherently involved complex circuit arrangements and attendant controlled operations necessarily resulting in errors by the attendant in performing her various duties such as intercepting calls and completing connections between a P. A. B. X subscriber and a central office subscriber and in releasing such connections.

Among the objects of the present invention is to provide a system of the character briefly described; means whereby the described and other difficulties including attendant controlled and supervised operations are reduced to a minimum; reduction of the amount of expensive equipment necessary for accomplishing the aforementioned services and operations and certain common equipment of a novel nature in a cordless attendant's cabinet for handling connections.

The features whereby the aforementioned objects are accomplished together with other improvements of the present invention will be fully understood from reading of the following specification and claims in conjunction with the drawings.

Fig. 1 is a schematic diagram showing the general arrangement of the equipment including the manner of routing calls between a P. A. B. X subscriber and the central office and other necessary routings.

Figure 4:
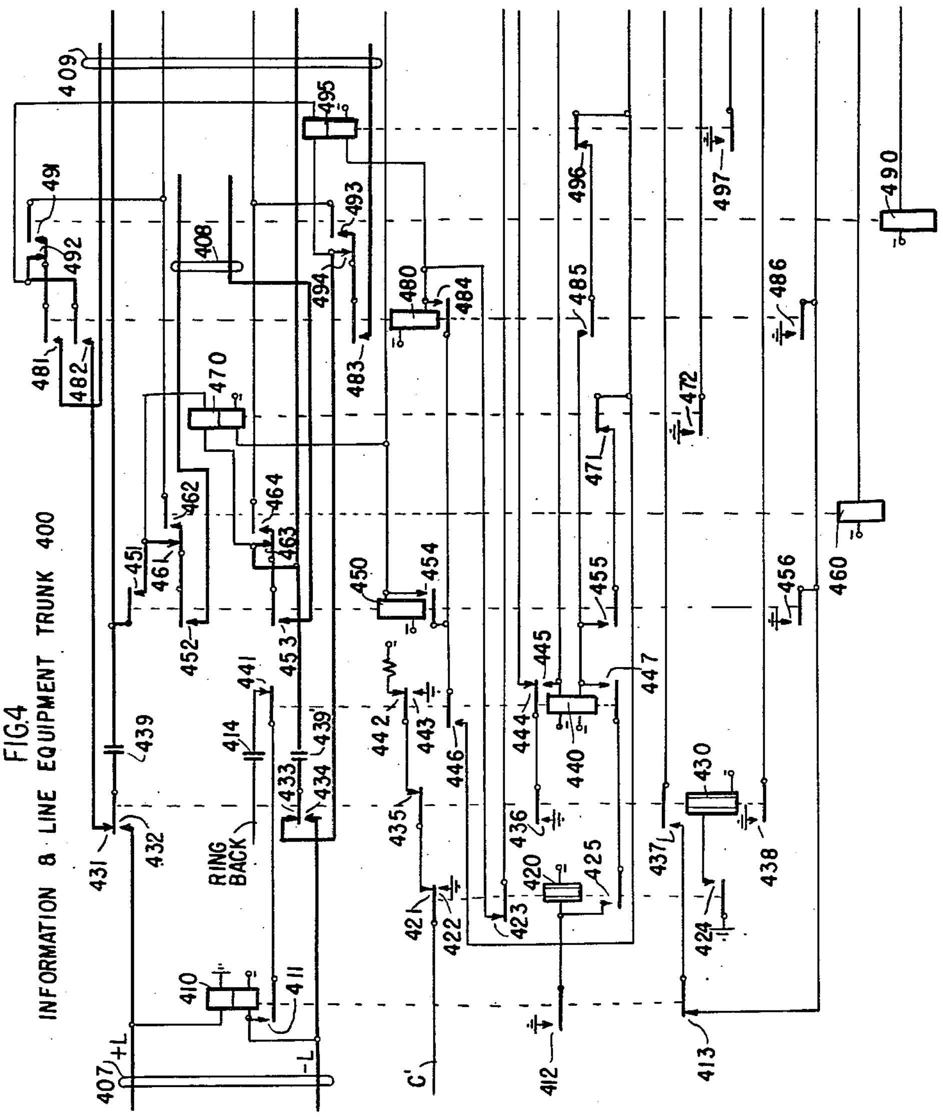

Fig. 4 is an information and line equipment trunk circuit arrangement for setting up outgoing calls from a P. A. B. X subscriber to the central office. It may also be used by the attendant for originating calls to either a P. A. B. X subscriber or a central office subscriber.

Figure 3:
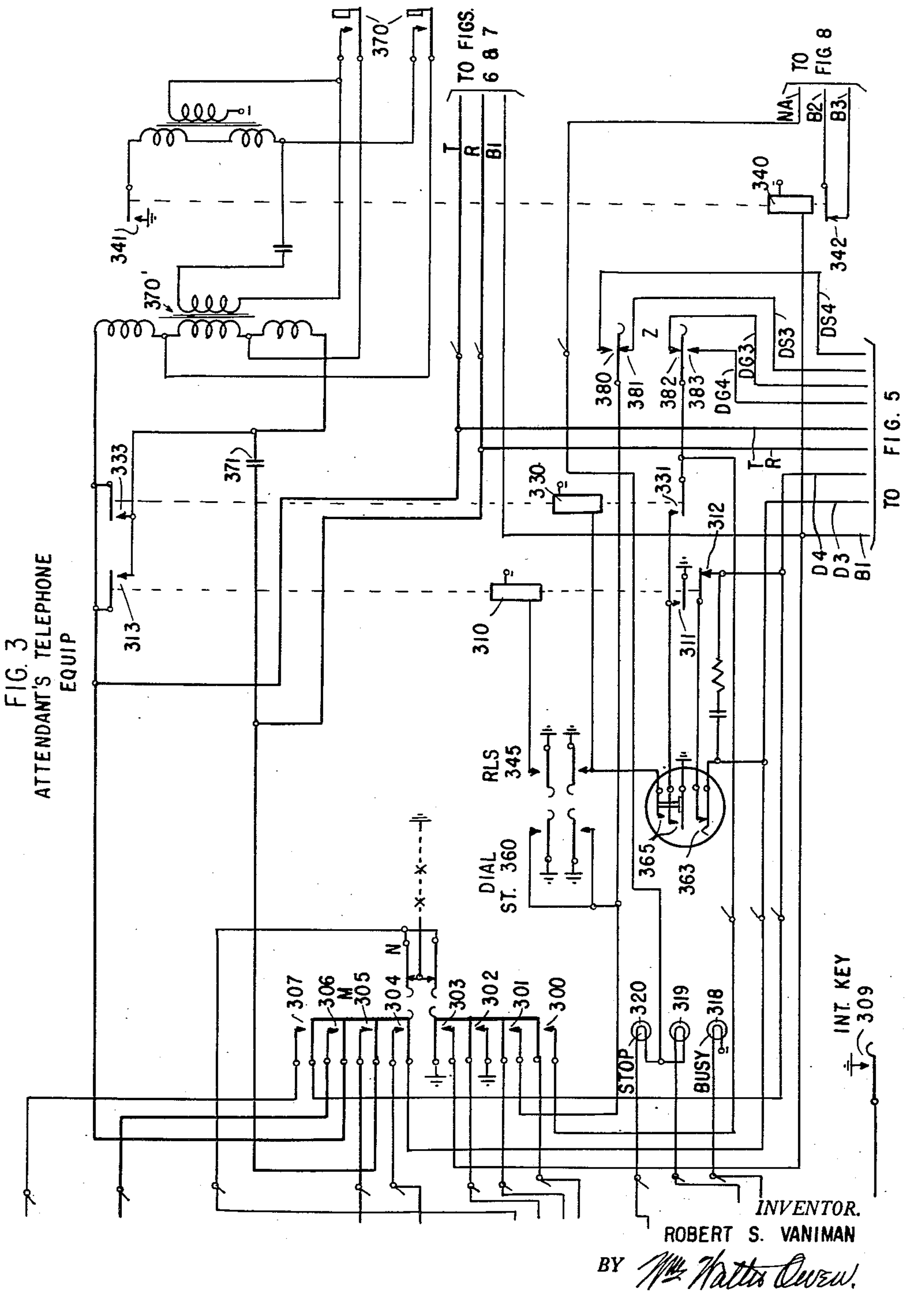
Fig. 3 shows the attendant's telephone equipment which is common equipment and which is used for handling connections over the trunk circuits. It also shows the circuit connections which are completed, on operation of the talk key M associated with a particular trunk, between the intercept circuit of Fig. 2 and the attendant's equipment.
Figure 5:
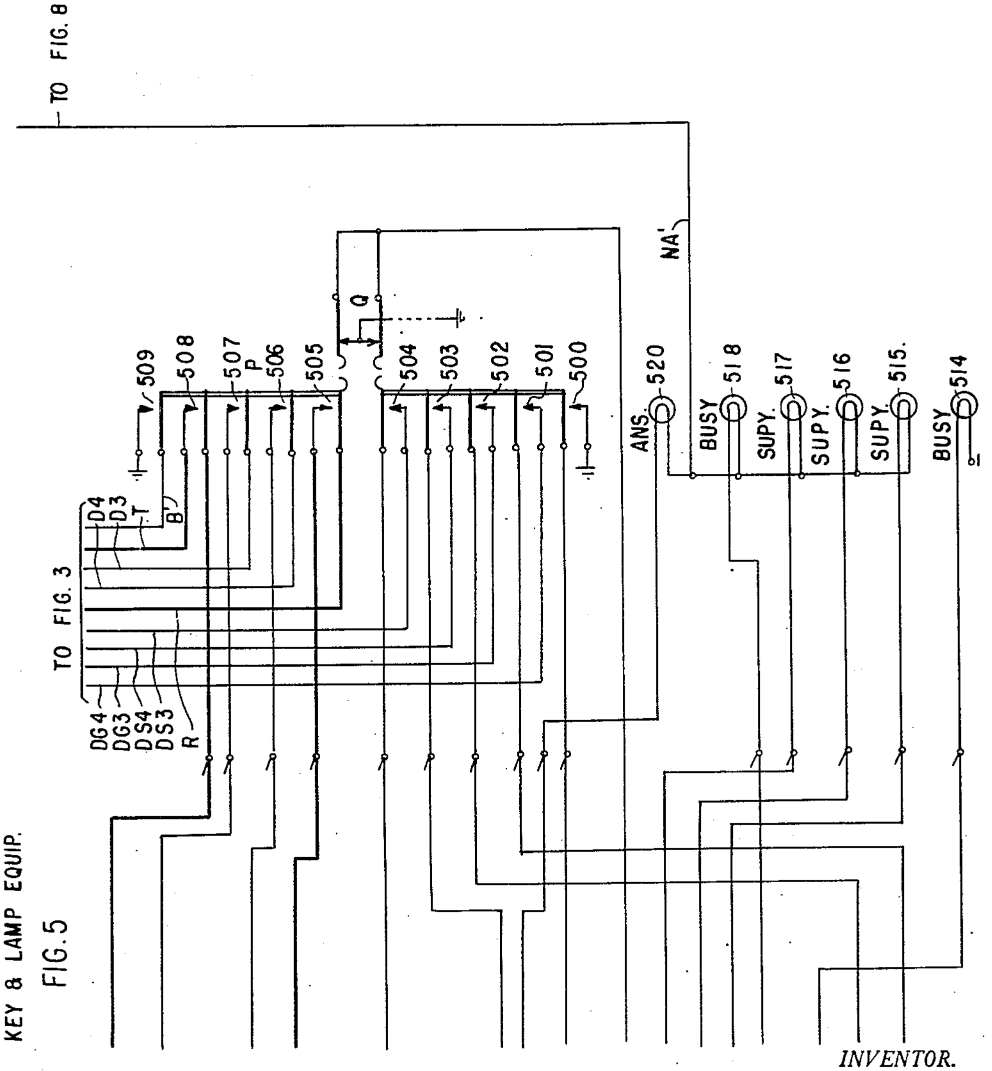

Fig. 5 shows the circuit arrangement for connecting the line equipment trunk 400 of Fig. 4 to the attendant's common equipment of Fig. 3.

Figures 6, 7, 8:
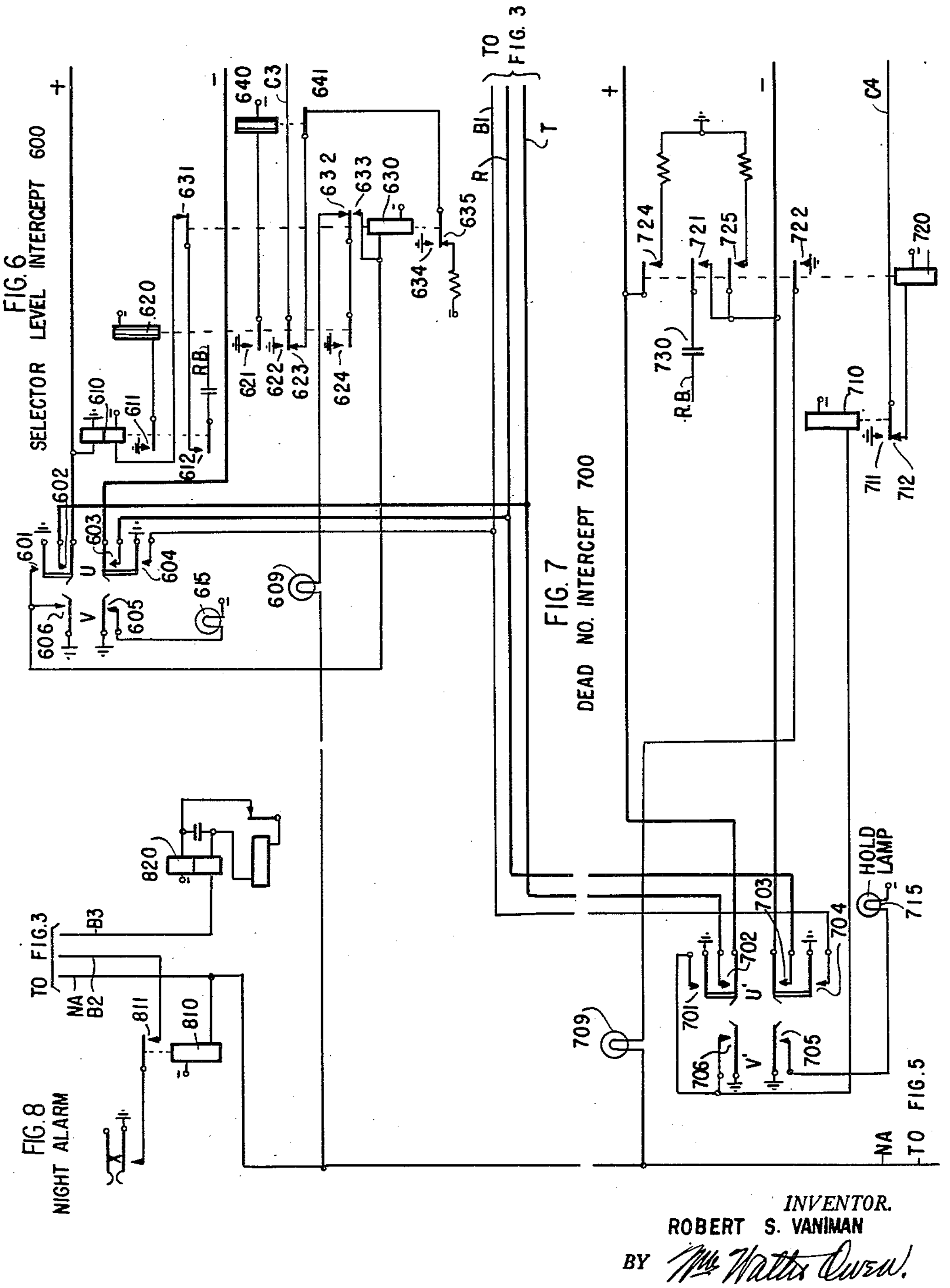

Fig. 6 shows a selector level intercept circuit and a switchboard circuit associated therewith.

Fig. 7 shows a dead number intercept circuit and a switchboard circuit associated therewith.

Fig. 8 is a night alarm circuit common to all of the equipment for signalling the operator during the evening periods.

Figure 1:
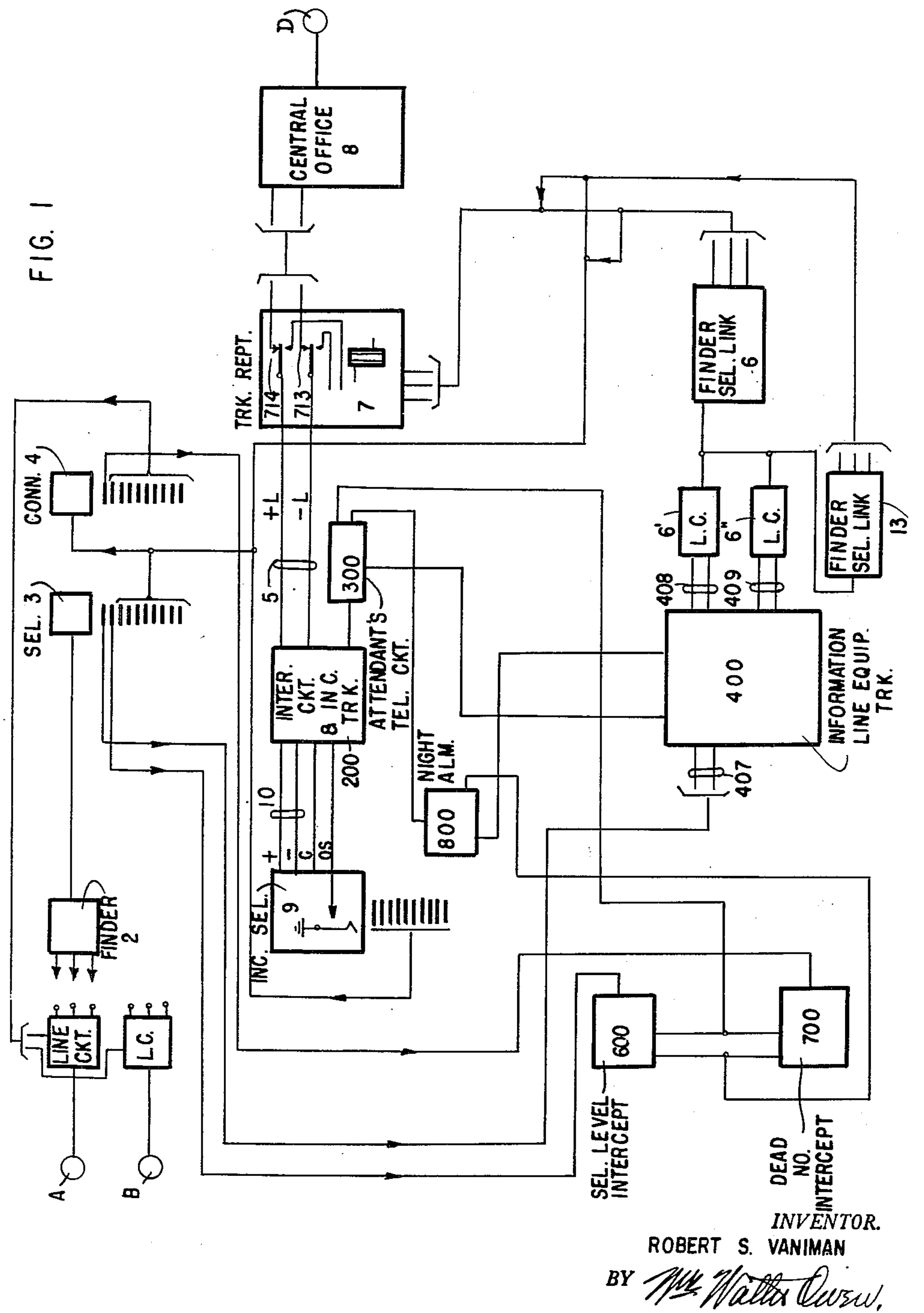
Figure 2:
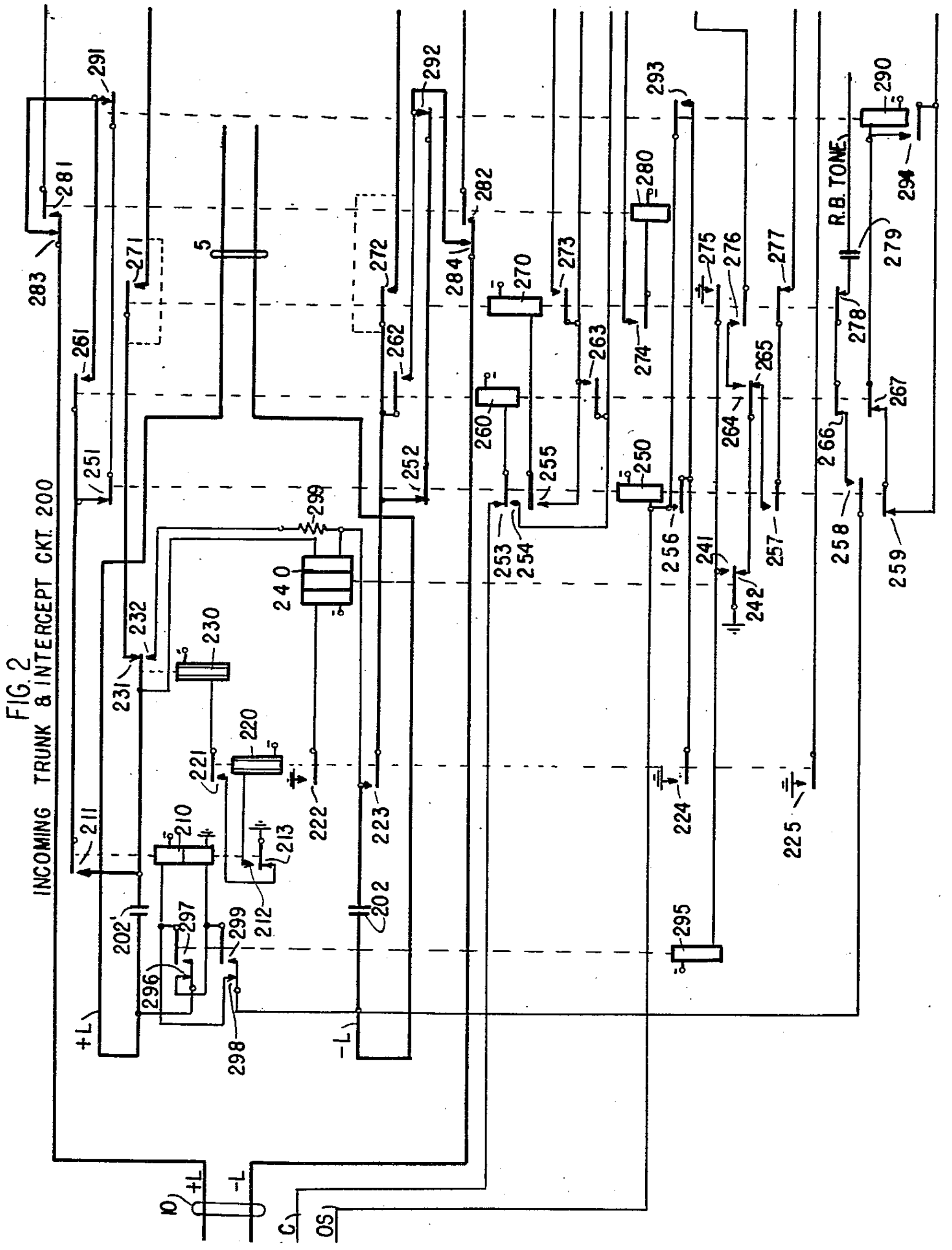
Fig. 2 is the circuit arrangement of the intercept trunk circuit 200 through which incoming calls from the central office are routed.

The present system contemplates but does not confine itself to the use of line circuits, finder-selector links and connector switches which have long been used in such systems and which are preferably of the Strowger step-by-step type. The incoming selector 9, the selectors included as part of links 6 and 13 and the connector, may be of a type which search for an absence of ground such as disclosed in Patent No. 2,189,400 issued to Lomax, February 6, 1940. Line circuits, finder, selector and connector switches are all shown in block form. The finder switches including those included as part of links 6 and 13 shown in block form are similar to that disclosed on page 110, Fig. 14 of a publication entitled Automatic Telephone Practice, 5th edition, by Harry E. Hershey, Copyright 1946. Selector 3 may be of a battery searching type such as disclosed in Fig. 12, page 102 of the Hershey publication. Fig. 1, page 93 of said publication shows a typical subscriber substation circuit including the usual receiver, transmitter, ringing and impulsing device arrangement; and Fig. 7, page 124 of the publication shows a typical 2-way repeater which is used with the present system. The structure and wiper assembly for the finder, selector and connector switches described is similar to that disclosed on Plate B of the above publication. Incoming selector 9 associated with the intercept trunk 200 is modified to provide a set of normal post springs closing, when the selector is stepped to the tenth level for sending ground back to the intercept trunk for a purpose to be explained. Finder-selector links 6 and 13 may both have access to line circuits 6′ and 6″ respectively, however for the purposes of the description link 6 will be considered as having access to line circuit 6′ and link 13 to line circuit 6″. Attention of the reader is called to the fact that the selectors search for an absence of ground and that all switches send ground back over their respective C leads to indicate that the switch is busy. Selector 3 although of a battery searching type will function with the connector disclosed in the aforementioned patent. Although only one of each type of switch is shown for performing a particular function, it will be understood that pluralities of each; finders, selectors, connectors, intercept trunks, information trunks, etc., comprise the system.

Although only one intercept circuit 200 and one information trunk 400 are shown in the system, each is connected in multiple to a number of different attendants' positions as shown in Figs. 3 and 5 respectively. The intercept circuit is accessed in any well-known manner directly over an idle trunk from the central office through a 2 way trunk repeater 7 shown in block form. For the purposes of discussion it will be assumed that a central office subscriber such as D may operate his impulsing device to step the switches automatically to make connections through the central office without the aid of an operator at the central office. An incoming selector 9 associated with intercept circuit 200 may then be operated to seize a connector such as 4 and the connector in turn operated to complete a connection to a P. A. B. X subscriber such as A or B.

The information and line equipment trunk 400 is accessed from the selector banks associated with the tenth level of selector 3 on an outgoing call by a P. A. B. X subscriber such as A or B. Calls are established by a P. A. B. X subscriber lifting his handset to complete a loop to his associated line circuit to in turn seize an idle finder-selector link. The subscriber may then operate the selector to seize a connector such as 4 and then complete a connection within the exchange or by operating the seized selector to its tenth level, seize an idle information trunk 400. If a selector level is under intercept service the subscriber is connected to a switchboard circuit associated therewith or if a dead number is dialled on the connector the subscriber is connected to a switchboard circuit of the same type associated with the particular bank contacts of the connector so that he may be informed of such fact by an attendant. The selector level intercept circuit and the dead number intercept circuit are each multipled to a corresponding switchboard circuit at each attendant's position. Each switchboard circuit may be connected to the attendant's common equipment on operation of a key associated with each switchboard circuit.

Each attendant's position is provided with a number of locking talk keys and a number of non-locking disconnect keys each individual to a particular trunk or switchboard circuit at each position. Each talk key is also connected in multiple to the common equipment. Operation of the talk key connects the attendant's telephone circuit and other common equipment to the particular trunk or switch board circuit so that she may perform the necessary services. Lamps associated with a particular trunk are commonly connected to all the attendants' positions so that each receives appropriate indications. The disconnect keys are connected in series as shown by the dotted lines through each other disconnect key associated with the particular trunk at the other positions to ground. Therefore operation of the disconnect key associated with a particular trunk at any attendant's position removes ground from certain equipment in the trunk. Circuits to various lamps associated with each trunk are completed over a common NA lead to battery through a relay 810 in the night alarm circuit 800. Relay 810 operates but completes no circuits unless the key X associated with the night alarm circuit is operated.

A call from a subscriber such as D through the central office 8 and through two way trunk repeater 7 can be completed directly through the intercept trunk circuit 200, incoming selector 9 and connector 4 to a P. A. B. X subscriber. If the calling central office subscriber desires to reach the attendant he dials a predetermined number for stepping the incoming selector 9 to a level where the operator is signalled and the selector 9 released. The attendant converses with the calling party and must then complete the connection. The attendant, if she desires may intercept all incoming calls by operating her intercept key. Termination of the connection and release of equipment may be accomplished without requiring any operation by the attendant thus preventing the prolonged use of equipment as occasionally happens when the attendant is required to perform disconnect operations. A call from a P. A. B. X subscriber may be completed within the exchange over finder 2, selector 3, and connector 4. If the connector 4 connects to a dead number, the call is rounted to the dead number intercept circuit 700 and the switchboard circuit associated therewith. The attendant then informs the calling party of the dead number. This operation also takes place on an incoming call from the central office. If a selector level has been placed in intercept service such as ninth level of the banks of selector 3 a call by a P. A. B. X subscriber will be routed directly to the selector level intercept circuit 600 and the switchboard circuit associated therewith so that the attendant may inform the calling party of the intercept.

If a P. A. B. X subscriber desires to reach a central office subscriber he first dials the tenth level on selector 3 to reach the information and line equipment trunk 400 and signal the attendant. The attendant then secures the desired information and completes the call to the central office over finder selector link 6 and two way trunk repeater 7. It will be assumed for the purposes of this discussion that the switches may be operated automatically by the attendant to complete a connection through the central office without the aid of an operator at the central office. In the event the call is a delayed call the calling P. A. B. X subscriber may disconnect while the attendant secures the desired central office subscriber over finder-selector link 6, trunk repeater 7 and the central office switches and then secures the calling P. A. B. X subscriber over finder-selector link 13 and connector 4 and completes a talking circuit between the P. A. B. X subscriber and the central office subscriber. Under certain conditions as will be explained later the call to the central office may be completed over link 13 and to the P. A. B. X subscriber over link 6. Likewise on a call from a P. A. B. X subscriber to a central office subscriber, release of the equipment may be accomplished without the aid of the attendant. As the manner in which talking circuits and other loops are established is well understood, only such part of said circuits as relate to the detailed circuit diagrams disclosed herein will be discussed. I will now describe in detail the equipment and operations for performing the aforementioned services.

*Calls from the central office direct to a P. A. B. X subscriber*

A call from the central office 8 by a subscriber such as D is extended to and through a two way repeating trunk 7 in any well-known manner and a loop is completed on one side over contacts 7A, the +L line of loop 5, contacts 296 of the incoming trunk 200 to ground on the right side of line relay 210 and on the other side over contacts 7B of the two way trunk repeater, −L line of the loop 5, contacts 298 and battery on the right side of relay 210. Relay 210 operates and closes contacts 211 and 212 and opens contacts 213. At contacts 212 an obvious circuit is completed for slow-to-release relay 220. Relay 220 on operating closes contacts 221—225. Contacts 221 on closing prepare a circuit for relay 230. At contacts 222 a circuit is completed for the left winding of polar relay 240 which relay does not operate now. Relay 240 operates after a circuit for the right winding has been completed over the loop to the called party and battery is reversed on the loop on answer by the called party. At contacts 223 a circuit is completed through the right hand winding of relay 240 and previously closed contacts 211 for operating the line relay (not shown) of the incoming selector 9. This circuit is completed over the −L line of loop 10, contacts 284, contacts 292, contacts 252, contacts 223, right winding of relay 240, contacts 211, 251, 291 and 283 and the +L line of loop 10. At contacts 225 a circuit is completed for operating the busy lamp 318 at the P. A. B. X attendant's board to indicate the trunk associated with the lamp is in use. Relay 260 of course operates from a ground in the selector sent back over the C conductor and contacts 253. It closes contacts 261—264 and opens contacts 265—267. Closing of contacts 261 and 262 shunts contacts 252, 292, and 251 and 291 respectively from the line loop 10 to the incoming selector 9. Closing of contacts 263 completes no circuit at this time nor does the closing of contacts 264. Opening of contact 266 opens a point in the circuit for providing ring back tone to the calling party.

On the first pulse of the first digit dialled through the central office, relay 210 of course releases to open contacts 211 and 212 and close contacts 213. Relay 220 is slow-to-release and maintains its contacts operated. Contacts 213 on closing complete a previously prepared circuit to slow-to-release relay 230 over contacts 231 and it operates. Relay 230 closes contacts 232 to shunt the right hand winding of relay 240 to improve pulse transmission and establish the pulsing circuit of the selector line relay through a resistance 299. Relay 230 remains operated only while a digit is being dialled and releases shortly thereafter when contacts 213 are opened. Therefore the winding of relay 240 is shunted only during dialling. The line relay of the selector is pulsed at contacts 211 to step the selector to the level corresponding to the dialled number where it searches for an idle connector. A connector 4 is seized and the connection established to the P. A. B. X subscriber on the dialling of the remain-digits of the called party's number. When the called party answers, battery is reversed in any well-known manner on the loop 10 and polar relay 240 is operated. Polar relay 240 opens contacts 242 and closes contacts 241 to complete a circuit to relay 295 which operates and closes contacts 297 and 299 to reverse battery on the loop 5 and the trunk back to the central office and give answer supervision. A talking circuit is now established between the calling and called subscribers' phones and includes on one side the —L line of loop 5, condenser 202, contacts 223, 262, 284 and the —L line of loop 10 and on the other side the +L line of loop 5, condenser 202', contacts 211, 261, 283 and the +L of loop 10.

By providing a shunt as shown by the dotted connections around contacts 271 and 272 respectively such calls using the trunk 200 may be monitored by the exchange attendant if she operates locking talk key M associated with the trunk and inserts her plug in jack 370 on noticing busy lamp 318 lit. Operation of key M completes a circuit from contacts 303 to relay 340 which operates contacts 342 to open a point in the night alarm circuit 800 and which closes contacts 341 to energize the attendant's telephone circuit. The attendent's telephone circuit is now connected to the previously described talking circuit from contacts 223, the dotted connection shunting contact 272, contact 305 of key M, condenser 371, repeating coil 370', contact 306 of key M, the dotted connection shunting contact 271 and contact 231. This circuit may be disconnected by the attendant releasing key M.

As in the aforementioned patent, release, is under control of the calling party, therefore release of the connection occurs when the central office subscriber D disconnects to open the loop to relay 210 which on releasing opens contacts 212. A circuit may momentarily be completed to relay 230 as contacts 213 close, however it operates for no effect. Slow-to-release relay 220 releases a short period of time after contacts 212 open to open contacts 221, 222, 224 and 225. Release of contacts 221 opens the circuit to relay 230 and it releases. Contacts 222 on opening release to open the circuit to the left hand winding of relay 40. Contacts 211 have opened to open the loop to the right winding of relay 240 and connector 4 and it releases to open the loop to the called P. A. B X subscriber. The selector 9 is in turn released thereby to open the circuit to relay 260 which releases. Relay 240 releases to open contacts 241 and release relay 295. Opening of contacts 224 affects no circuit on this type of call. Contacts 225 on opening opens the circuit to busy lamp 318 at the attendant's board so that she knows the call is completed. Relay 295 on restoring of course closes contacts 296 and 298 to restore the loop 5 to normal.

If the called P. A. B. X subscriber initiates release of the connection, battery on the loop through the winding of relay 240 is returned to normal and relay 240 releases to release relay 295 as described. Release of relay 295 returns the polarity on loop 5 to normal to provide disconnect supervision to the central office. Relays 210 and 220 may then be released by the calling party or the operator at the central office depending on who may control the connection to complete the aforedescribed release operations. The P. A. B. X attendant performs no operations for releasing the equipment and therefore no problems are presented as to keeping equipment in use for an undue length of time as occasionallq happens if the attendant is busy or momentarily forgets her duties.

*Calls from central office extended by P. A. B. X attendant*

The P. A. B. X attendant may be signalled on a call proceeding from the central office by dialling a predetermined level on the incoming selector 9. The incoming trunk 200 and the incoming selector 9 are seized in the same manner as previously described. Relays 210, 220 and 260 in the incoming trunk are therefore operated and the busy lamp 318 on the attendant's board is lit. If the selector is stepped to a predetermined level, such as the tenth, a set of normal post springs are closed in any well-known manner and the OS lead is grounded for operating relay 250. Relay 250 on operating opens contacts 251, 252, 253 and 259 and closes contacts 254, 255, 256, 257 and 258. Opening of contacts 251 and 252 opens the loop 10 to the selector 9 and the selector releases. Opening of contacts 253 removes the selector ground from relay 260 and it releases while another circuit is prepared for it at contacts 254. Contacts 255 on closing prepare a circuit for relay 270. Contacts 256 on closing provide a holding circuit for relay 250 over contacts 256 and previously operated contacts 224. Contacts 257 on closing complete a circuit to the attendant's answer lamp 319 from ground at contacts 242, contacts 265 which closed on release of relay 260, contacts 257, contacts 277, answer lamp 319 over lead NA to battery through relay 810. Closing of contacts 258 and 266 now provides ring back tone over condenser 279, contacts 278, 266, 258 and the —L line of loop 5 back to the calling party.

The attendant on seeing the answer lamp lit now presses the locking talk key M associated with trunk 200 and completes a circuit from ground through key contacts 302, contacts 255, to relay 270 which operates. Relay 270 closes contacts 271, 272, 273, 274, 275, 276 and opens contacts 277 and 278. Closing of contacts 271 and 272 completes a talking circuit to the central office over one side of loop 5 through condenser 202', contacts 231, 271, 306 of key M, coil 370, condenser 371, contacts 305 of key M, contacts 272, 223, condenser 202 back over the other side of loop 5 to the central office. When key M was operated to close contacts 303 a circuit was completed to relay 340 which operated to close contacts 341 to prepare an energizing circuit for the attendant's phone as described. Conversation may take place when the attendant inserts her plug in jack 370. An additional holding ground for relay 270 is provided over contacts 273 and non-locking disconnect key N associated with trunk 200. A circuit is prepared for relay 280 at contacts 274. At contacts 275 a circuit is completed for relay 295 which operates and reverses battery on loop 5 to the central office by closing contacts 297 and 299 so that the central office has answer supervision for charging the calling subscriber. Contacts 276 close to prepare a circuit to the supervisory lamp 320. Contacts 277 open to extinguish answer lamp 319 and contacts 278 open to remove the ring back tone from the loop 5.

On securing the desired information the attendant momentarily closes non-locking dial start key 360. Ground is now sent over contact 301 of key M, previously closed contacts 254 and the winding of relay 260 to battery to operate relay 260. Relay 260 operates its before described contacts to cause the operation of the line relay of the selector over a circuit including the —L line of loop 10, contacts 284, 262, 223, the right winding of relay 240, contacts 211, 261, 283 and the +L line of loop 10. Supervisory lamp 320 lights over a circuit from ground over contacts 242, 264, 276, lamp 320, over lead NA to battery on the other side of relay 810. The attendant now operates her dial. On the first pulse off-normal springs 365 are closed to complete an obvious circuit to slow-to-release relay 330 which operates to close contacts 331. Contacts 333 also close to shunt coil 370 to thereby prevent dial pulses from being reproduced in the operator's receiver. Contacts 331 on closing forward ground from springs 365 over contacts 331 and 300 of key M and contacts 274 to operate relay 280 which opens contacts 283 and 284 and closes contacts 281 and 282. Dial pulses will not be heard by the calling party or the central office as condenser 202', contacts 211, 261 and condenser 202, contacts 223, 261 respectively are disconnected from the pulsing circuit. This opens the previously described circuit for operating the line relay of the selector 9 and now completes a pulsing circuit for the selector line relay which includes the +L line of the loop 10, contacts 281, contacts 307 of key M, contacts 312, dial springs 363, contacts 304 of key M, contacts 282 and the —L line of loop 10. Thus the selector 9 is stepped in accordance with the dialled digit to seize a connector 4 which may then be operated in any well-known manner from the attendant's dial to connect to the line of a called P. A. B. X subscriber B. Relay 330 of course is held operated only during the dialling of each digit as is relay 280. Therefore release of relay 280 prepares the previously described talking circuit between the calling and called subscribers which is completed on answer by the called party.

On answer by the called P. A. B. X subscriber, battery is reversed on the trunks in any well-known manner and relay 240 operates to open contacts 242 to extinguish supervisory lamp 320 so that the attendant knows that the call is answered. As relay 295 has already operated the central office will not receive reverse battery at this time. She now releases talk key M. Relay 260 is held operated as follows: battery winding of relay 260, contacts 254, 263, 273 and ground on disconnect key N. Relay 270 is held operated over contacts 255, 273 and ground on disconnect key N.

The P. A. B. X subscriber at the end of the conversation disconnects to release relay 240 and close contacts 242 to relight the supervisory lamp 320 as described. The attendant on being signalled operates the non-locking disconnect key N to release relays 260 and 270 to extinguish lamp 320 and light lamp 319. As will be explained, the attendant need not operate the key if the calling party also disconnects. Relay 270 opens contact 275 to release relay 295. Relay 295 on releasing returns battery to normal on the trunk to the central office to give disconnect supervision so that the calling party may open the loop to line relay 210 so that it may release to in turn release relay 220 which in turn releases relays 230 and 250 at contacts 222 and 224 respectively, and thus complete the described release operations. Relay 250 releases to open the circuit to lamp 319 at contacts 257.

In the event the calling party disconnects before or substantially simultaneously with the P. A. B. X subscriber as often happens, the line loop extending from the intercept circuit 200 to the P. A. B. X subscriber is initially broken at contacts 211 on release of relay 210, to complete the previously described release operations for relay 220, 230 and 240. Relay 220 on releasing opens contacts 224 to release relay 250 which in turn opens contacts 254 and 255 to release relays 260 and 270 respectively. Relay 295 releases as relays 240 and 270 are released. The loop through the right winding of relay 240 is opened and connector 4 releases to in turn release selector 9. It will be noted that the attendant need not operate the disconnect key to release the connection as relay 220 on releasing releases relay 250 at contacts 224 which in turn releases relays 260 and 270 at contacts 254 and 255 respectively to complete the release operations without the aid of the attendant.

Observation is made at this time of the fact that the disconnect key is non-locking and if operated need only be operated once, thereby eliminating the necessity of having the attendant operate the key and later release it. As noted the attendant need not operate the key if the calling party or both parties terminate the connection. This insures a minimum tieup of trunk circuits when it is important that they be available. It should be further observed at this time that the talk key is only operated once to associate the common equipment with the desired trunk and released once to disassociate the common equipment from the trunk.

*Transfer of an extended central office call from one P. A. B. X subscriber to another*

Assume that a P. A. B. X subscriber B wishes to transfer a completed call to himself to another P. A. B. X subscriber A. As previously described on a call extended by a P. A. B. X attendant relays 210, 220, 240, 250, 260 and 270 remain operated during the conversation. The P. A. B. X subscriber operates his phone switchhook several times to restore and operate relay 240 accordingly. Relay 240 on restoring and operating closes contacts 242 to light supervisory lamp 320 intermittently to signal the attendant. The attendant operates talk key M so that she may converse with both parties over a previously described talking connection including contacts 272 and 271 instead of the dotted suggested connections to secure the number of the other desired P. A. B. X subscriber; and then she momentarily operates her non-locking release key 345 to complete obvious circuits to slow-to-release relays 310 and 330 which close their associated contacts 311 and 331 respectively to complete a circuit over contacts 300 and 274 to operate relay 280. Relay 280 operates to operate its previously described contacts and open the operating circuit for the line relay of the connector 4 and thereby release it and selector 9. A pulsing circuit is not completed yet because contacts 312 have been opened on operation of relay 310. Contacts 313 and 333 are closed to shunt repeating coil 370' and the attendant's headset to prevent noises from being generated therein. Shortly thereafter relays 310 and 330 release to close contacts 312 and complete a previously described circuit to the selector line relay and open the circuit to relay 280 which releases. The operator may now dial the other desired P. A. B. X party over selector switch 9 to establish the connection in a manner previously described. Thus the transfer operation for all the trunks is controlled from the common equipment which may be associated with individual trunks while the attendant may be signalled at a cordless attendant's cabinet for the purposes of transferring the call by the called subscriber operating his switchhook.

*Attendant controlled intercept service*

The P. A. B. X attendant by operating locking intercept key 309 closes a circuit over contacts 259 and 267 to relay 290 which closes contacts 293 and 294. At contacts 294 it completes its holding circuit to the intercept key 309. At contacts 293 a circuit is prepared for relay 250 which will operate over contacts 224 and 293 when relays 210 and 220 are operated on seizure of the intercept circuit 200 as previously described on an incoming call from the central office. At contacts 291 and 292 the original circuit for seizing the line relay of selector 9 on a non intercepted call from the central office over loop 10 is opened. Relay 250 now operates on an incoming circuit to operate its previously described contacts. At contacts 257 a previously described circuit to the answer lamp 319 is completed so that the operator knows that an incoming call has been intercepted and she must answer. She now operates talk key M and inserts her plug in jack 370 to converse with the central office subscriber or the calling party and secure the desired information. She now performs the previously described sequence of operations on an intercepted incoming central office call to secure the desired P. A. B. X subscriber. In the event the attendant operated her intercept key 309 after relay 260 operated on a non intercepted incoming call from the central office no circuit is completed to relay 290 as contacts 267 are opened so that the described intercept service will not occur unless the calling party dials a selector level that will be intercepted by the attendant as has been described. If however the intercept key is operated before relay 260 has operated on an incoming call the attendant will be able to operate relay 290 and the call will be intercepted by the attendant as described as relay 250 will operate to prevent initial operation of relay 260 and the completion of a circuit to the line relay of selector 9. Intercept service is completely under the control of the attendant with the exception of those incoming calls that have already resulted in the operation of relay 260. The intercept key may if desired be commonly connected to a large number of trunks to control intercept service over many trunks in one operation. Further, the attendant need not pay any attention to the busy or idle condition of a trunk before operating her intercept key as its operation will not interfere with a call in progress.

*Selector level intercept for a calling P. A. B. X subscriber*

A P. A. B. X subscriber dialling a selector level such as the ninth level on selector 3 which has been placed in intercept service extends to a loop to line relay 610 of the selector level intercept circuit 600 in any well-known manner which operates to close contacts 611 and 612. A calling central office subscriber may be given the same type of service on a selector level of selector 9. Contacts 611 on closing complete an obvious circuit for slow-to-release relay 620. Ring back tone is provided to the P. A. B. X subscriber over contacts 612 and 631 and the loop. Relay 620 on operating closes contacts 621, 622 and 624 and opens contacts 623. At contacts 623 battery is removed from the C3 lead to selector 3 and at contacts 622 ground is sent back to the selector switch over the C3 lead so that it may be held in any well-known manner. Closing of contacts 621 completes an obvious circuit for slow-to-release relay 640 and it operates to open another point at contacts 641 in the original battery searching circuit for the selector switch. At contacts 624 a circuit is completed to the answer lamp 609 of the attendant's switchboard circuit associated with the selector level intercept circuit 600 and winding of relay 810 to battery to signal the attendant.

The attendant closes locking key U. A ground is now forwarded from contacts 601 for operating relay 630 which opens contacts 631 and 632 and closes contacts 633 and 634. Opening of contacts 631 opens a point in the ring back circuit to the calling subscriber so that he knows the call is being answered. At contacts 632 the circuit to the answer lamp 809 is opened and it extinguishes. At contacts 633 a holding circuit is provided for relay 630 from contacts 624. At contacts 634 another ground is prepared to the C3 lead and at contacts 635 another point in the circuit for providing battery to the C3 lead is opened. At contacts 604 a circuit is completed over lead B1 for operating relay 340 for energizing the attendant's phone. At contacts 602 and 603 of key U a talking circuit is completed over conductors T and R respectively and repeating coil 370'. The attendant now converses with the calling party and holds the call by operating locking key V and restoring the answer key U. Closing of contacts 605 completes a circuit for operating hold lamp 615 while closing of contacts 606 completes a circuit for holding relay 630 of the selector intercept circuit operated while the calling party disconnects. Release of answer key U opens the talking circuit at contacts 602 and 603 and removes the original ground for holding relay 630 operated at contacts 601 and allows relay 340 to release at contacts 604.

When the calling party disconnects, line relay 610 releases to open the circuit to relay 620 at contacts 611. Relay 620 releases after a period of time to open the circuit to relay 640 and prepare a point in the original circuit for placing battery on the C3 lead and at contacts 624 opens the original holding circuit for relay 630. Relay 640 releases shortly thereafter closing contacts 641 and ground is now furnished for the C3 lead over contacts 634, 641 and 623. The attendant releases the hold key V in a few moments to restore relay 630 and the hold lamp 615. Relay 630 on restoring completes the original circuit for placing battery on the C3 lead at contacts 635.

*Dead number intercept*

In the event a calling P. A. B. X subscriber or a calling central office subscriber dials digits corresponding to a dead number, the connector 4 will come to rest on the connector bank terminals connected to the dead number intercept circuit 700. The connector 4 finds battery over the winding of relay 720, contacts 712 and the C4 lead. Relay 720 operates from the ground in the connector and closes contacts 721 and 722. At contacts 724 and 725 a polarity is provided opposite to that of the connector ring cut-off relay to operate the same. Ring back tone is provided to the calling party over condenser 730, contacts 721 and the loop back to the calling party. At contacts 722 a circuit is completed from ground, contacts 722, lamp 709, NA lead to battery through relay 810 for operating the answer lamp. The operator now operates locking key U' for completing an obvious circuit to relay 710 at contacts 701. Relay 710 operates to ground lead C4 to prevent the dead number intercept from being seized by another connector and opens the circuit to relay 720 which releases to cut-off the ring back tone so that the calling party knows that the call is being answered. It also opens the circuit to the answer lamp 709 which extinguishes. Operation of key U' also enables completion of the aforedescribed operations for establishing a talking circuit to the attendant's telephone circuit. The hold key V' is operated and key U' released to open the talking circuit while relay 710 is held from the ground on contacts 806 and hold lamp 815 operated, as already described. The calling party having disconnected, the operator releases the hold key V' a few moments later for releasing relay 710 to restore battery to the C4 lead and restore hold lamp 715.

*Calls from a P. A. B. X subscriber to the central office*

A call from a P. A. B. X subscriber A is initiated by lifting his handset to cause the finder 2 to search for and find the line circuit 1 of the subscriber A in the well-known manner. The selector 3 associated with the finder 2 is then seized in the well-known manner and sends dial tone back to the calling party. The subscriber A now dials the information trunk number 0 for example to step the selector to its tenth level where it automatically searches for an idle information and line equipment trunk 400. The selector 3 is a battery searching type and finds battery over the C' lead of the information trunk, contacts 421, contacts 435 and 442. The selector 3 terminates its operation on finding battery and now extends a circuit over loop 407 to line relay 410 of the information trunk. Relay 410 operates and closes contacts 411 and 412 and opens contacts 413. Closing of contacts 411 provides ring back tone over condenser 414, contacts 441 and the loop to the calling party so that he knows the attendant is being signalled. Closing of contacts 412 completes an obvious circuit for slow-to-release relay 420 which operates to open contacts 421 and 423 and close contacts 422, 424 and 425. Closing of contacts 425 serves no purpose at this time. Contacts 422 on closing now switches battery from the C' lead and provides ground to hold the preceding selector switch 3. Opening of contacts 423 has no effect at this time. Closing of contacts 424 completes an obvious circuit for slow-to-release relay 430 which operates to open contacts 431, 433, 435 and close contacts 432, 434, 436, 437 and 438. Closing of contacts 432 and 434 prepares a point in the talking circuit between the subscriber and attendant. Opening of contacts 435 opens another point in the circuit for providing stopping battery on the C' lead. Closing of contacts 436 completes a circuit over contacts 434, answer lamp 520, the NA lead and the winding of relay 810 to light the answer lamp 520. Closing of contacts 438 completes a circuit to the busy lamp 518 over the NA lead to battery on the other side of relay 810 and it lights. Thus the trunk is indicated as busy and the attendant accordingly knows she must answer.

The attendant noticing the answer and busy lamps associated with the particular trunk lit now presses her locking talk key P. A circuit is completed at contacts 500 for relay 440. Relay 440 operates to open contacts 441, 442, 444 and closes contacts 443, 445, 446 and 447. Opening of contacts 441 disconnects ring back tone to the calling party so that he knows the call is being answered. Opening of contacts 442 opens another point in the circuit for providing battery to the C' lead and a ground is placed on this point at contacts 443. At contacts 444 the circuit to the answer lamp is opened and the lamp extinguishes, while at contacts 445 an obvious holding circuit for relay 440 is completed over contacts 436. Closing of contacts 446 prepares a circuit for relays 450 and 480. Closing of contacts 447 prepares a point in another holding circuit for relay 420.

Closing of key P extends a talking circuit from the +L line of loop 407, contacts 432, condenser 439, contacts 508 of key P, conductor T, repeating coil 370', condenser 371, conductor R, contacts 505 of key P, condenser 439' and the —L line of loop 407. At contacts 509 ground is forwarded over the B1 lead to relay 340 and relay 340 operates to open contacts 342 and close contacts 341 as previously described. The attendant, having inserted her plug in jack 370, may now converse and secure the desired information as on closing of contacts 341 her phone is energized.

To reach the central office the attendant operates the non-locking dial start key 360 to complete a circuit over contact 381 of line key Z, DS3 lead, contact 504 of key P to relay 450 and the lower winding of polar relay 470. Relay 450 operates to close contacts 451, 452, 453, 454, 455 and 456. Closing of contacts 451 is important when a talking circuit between the calling and called party is established for it enables the shunt of the upper winding of relay 470 from this talking circuit. Closing of contacts 452 and 453 completes a loop for the line circuit 6' from one side of loop 408 through contacts 452, the upper winding of relay 470, contacts 463, 453 and the other side of loop 408 to operate the line relay (not shown) of line circuit 6' associated with loop 408 of trunk 400 to initiate the operation of finder-selector link 6 for finding the trunk 400; to extend loop 408 to the line relay of the selector and to enable the extension of a loop through trunk repeater 7 to the central office 8. Relay 470 operates. Closing of contacts 454 completes a holding circuit for relay 450 and the lower winding of relay 470 over contacts 446 and ground on non-locking release key Q. Contacts 455 prepares a holding circuit for relays 420 and 440 which is not completed as contacts 471 are opened as relay 470 also operates. Contacts 456 complete a circuit to busy lamp 514 for indicating that dialling may proceed. Closing of contacts 472 by relay 470 completes a circuit over lead NA and winding of relay 810 to light the supervisory lamp 516 so that the attendant knows that equipment associated with loop 408 is seized.

The attendant may now dial the digit 0 to step the selector of finder-selector link 6 to its tenth level for seizing trunk repeater 7. On the first pulse as previously described relay 330 operates from a ground on off-normal springs 365 to close contacts 331 and 333 and shunt the attendant's phone. Closing of contacts 331 now completes a circuit from ground on off-normal springs 365, contacts 382 of line key Z, lead DG3, contacts 502 of key M to relay 460. Relay 460 operates and closes contacts 462 and 464 and opens contacts 461 and 463 to shunt the upper winding of relay 470 and the calling party's talking circuit at contacts 451, condenser 439 and contacts 453 and condenser 439' respectively. A pulsing circuit for the line relay of the selector is now extended however from loop 408 over contacts 506 and 507 of key M, leads D4 and D3 respectively to the dial pulsing springs 363 so that the line relay will be stepped to its tenth level and there search for an idle trunk 7 to switch the trunk to the central office at contacts 7A and 7B respectively and extend the loop to the central office 8 in the well-known manner. Relay 470 releases and closes contacts 471 to complete the holding circuit for relays 440 and 420 over contacts 455, 471 and key Q and at contacts 472 opens the circuit to supervisory lamp 516. Relay 460 will release at the end of each digit dialled to in turn reestablish the loop through the upper winding of relay 470 and it will reoperate. Trunk repeater 7 on being seized switches contacts 7A and 7B to break the connection to the intercept circuit 200 and establish a trunk connection from the information trunk 400 through finder-selector link 6, trunk repeater 7 and central office 8. If the connection is one to be established by an operator at the central office, the attendant may now relay the desired information to the operator at the central office and she may dial the desired called subscriber. On the other hand if the central office is arranged for automatic switching the attendant may operate the dial pulsing springs 363 to automatically complete the connection in any well-known manner. After the dial operation relay 330 releases as does relay 460 as ground is removed from off-normal springs 365. Relay 460 reestablishes the loop through the upper winding of relay 470 and opens the loop circuit through the dial springs 363. Relay 470 reoperates and opens the holding circuit for relay 440 at contacts 471 and relights supervisory lamp 516 at contacts 472.

Reverse battery supervision, provided from the central office on answer by the called party releases relay 470 to close contacts 471 and again complete the aforedescribed holding circuit for relays 440 and 420 over contacts 455, 471 and disconnect key Q. Opening of contacts 472 extinguishes supervisory lamp 516 and the attendant may now withdraw her plug from the jack 370 and the conversation may proceed. The attendant will also restore talk key P to open the original operating circuit for relay 445 and relay 340. The talking circuit between the calling and called subscribers on one side includes the +L line of loop 407, contacts 432, condenser 439, contacts 451, 461, 452 and one side of loop 408 and on the other side includes the —L line of loop 407, contacts 434, condenser 439', contacts 463, 453 and the other side of loop 408. Contacts 451 and 453 act to provide the previously mentioned shunt of the upper winding of relay 470 on completion of this talking circuit. The attendant may monitor this connection at any time simply by closing key P and inserting her plug in jack 370 as contacts 505 and 508 of key P are connected directly to condenser 439' and 439 respectively.

When the P. A. B. X subscriber disconnects after the conversation is terminated, the loop to relay 410 is opened and it releases to open contacts 411 and 412 and close contacts 413. Opening of contacts 412 causes relay 420 to release if contacts 425 are omitted after a short period of time to in turn open contacts 422; however ground is forwarded from contacts 443 over the C' lead as soon as relay 430 releases to prevent seizure of trunk 400. At contacts 424 it opens the circuit to relay 430 and it will release after a short period of time. If contacts 425 are provided only relay 410 will release when the P. A. B. X subscriber disconnects and relay 420 and 430 may be released by the attendant if the central office subscriber fails to disconnect. In the meantime a circuit is completed from ground on contacts 456 over contacts 413 and 437, lamp 517, lead NA to battery through relay 810 for lighting supervisory lamp 517. Release of relay 430 opens this circuit a moment later. At contacts 433 it also opens the circuit to busy lamp 518 and it extinguishes to inform the attendant the P. A. B. X subscriber has disconnected. As contacts 436 now open, the original holding circuit for relay 440 is opened, but it is held operated over contacts 455, 471 and disconnect key Q. As the central office subscriber will by now have disconnected to return battery on loop 408 to normal, relay 470 will operate to open contacts 471 and release relay 440. If contacts 425 are provided and relay 420 was therefore also held operated after relay 410 released, it will now also be released to allow the release of relay 430 and release of relay 430 will in turn allow the release of relay 440, if relay 440 was not released on opening of contacts 471 due to relay 430 being held operated by relay 420. Relay 440 on releasing opens the circuit to relay 450 and the lower winding of relay 470 at contacts 446 and they both release. Relay 450 on releasing opens the loop circuit 408 at contacts 452 and 453 to the central office to release the switches and provide disconnect supervision there and at contacts 456 opens the circuit to busy lamp 514 which extinguishes. Relay 440 on releasing closes contacts 442 to restore battery to the C' lead and prepare the information trunk for seizure. Thus the connection is automatically released without the aid of the attendant.

In the event the connection is released by the called central office subscriber, battery will be returned to normal on the trunks extending from the upper winding of relay 470 and it will reoperate to open contacts 471 and close contacts 472. Closing of contacts 472 relights the supervisory lamp 517 and the operator knows that the conversation is terminated by the central office subscriber. She then operates her disconnect key Q to open the holding circuits for relay 450 and the lower winding of relay 470 so that they both release. This latter operation of course is unnecessary if as usually happens both parties disconnect practically simultaneously to complete the previously described automatic release sequence. Opening of contacts 472 again extinguishes supervisory lamp 517. Opening of contacts 452 and 453 of course breaks the loop circuit to the central office. The operator may now operate talk key P and insert her plug in jack 370 to converse with P. A. B. X subscriber over the previously described monitor circuit and instruct him to disconnect to thereby release relays 410, 420 and 430 as previously described. Relay 440 will release on opening of its first holding circuit as its holding circuit to disconnect key Q is already opened.

If reverse battery supervision is not provided as may occur on a toll call, relay 470 remains operated as does lamp 516 so that the attendant may monitor the call to determine when conversation has terminated. If contacts 425 are omitted relay 420 will release after the P. A. B. X subscriber disconnects to open loop 407 to in turn release relay 430 and extinguish lamp 518 to inform the attendant that the P. A. B. X subscriber has disconnected. With contacts 425 provided, a previously described holding circuit for relay 420 is completed and the attendant must monitor to determine when the conversation is over and then operate key Q to open the holding circuit to relays 420, 440 and 450 and the lower winding of relay 470. When the P. A. B. X subscriber disconnects, relay 410 releases and if the holding circuit to relay 420 is opened it releases to in turn release relay 430. Relay 450 on releasing opens the loop 408 to release the equipment for providing a connection to the called party and open the upper winding of relay 470. It will also be noticed that as long as relay 420 is operated, relay 480 cannot be operated and therefore loop 409 could not be used to extend a call from the trunk 400.

*Delayed calls between a P. A. B. X subscriber and central office subscriber*

On a delayed call between a P. A. B. X subscriber and a central office subscriber the P. A. B. X subscriber first operates the selector 3 to seize the information and line equipment trunk 400 as previously described and operate relays 410, 420 and 430 and complete a circuit for operating answer lamp 520 and busy lamp 518 as previously described. The attendant now operates talk key P for operating relay 340 and 440 as previously described and completes the previously described talking circuit for conversing with the calling party and on securing the desired information instructs the P. A. B. X subscriber to disconnect and leaves key P operated for maintaining relays 440 and 340 operated. Assuming contacts 425 of relay 420 are omitted, relay 440 prevents seizure of line equipment trunk 400 by another selector such as 3 by maintaining ground on the C' lead over contacts 443, 435 and 421 as the calling P. A. B. X subscriber by disconnecting of course releases relay 410 to in turn release relays 420 and 430 as already described. The switches of course release. If contacts 425 are provided, relays 420 and 430 will not release and the trunk 400 is busied at contacts 422. If contacts 425 are provided and the attendant desires to establish a connection using loop 409 as will be explained, key P is released and key Q operated to release relays 420, 430 and 440.

In order to extend the connection key P must be operated to complete the aforementioned circuits to relays 440 and 340 which operate to operate their aforementioned contacts. Thus if the attendant releases key P and operates disconnect key Q to release relays 340 and 440, and if contacts 425 are provided, relay 420, she must reoperate key P to again operate relays 440 and 340. The dial start key is now operated and previously described circuits for operating relays 450 and 460 are completed as is a circuit to the lower winding of relay 470. Line circuit 6' is seized, lamps 516 and 514 lit and finder-selector link 6 is associated with trunk 400 for extending loop 408 through trunk repeater 7 to the central office on dialling of the digit 0 by the attendant as described.

On answer by the called central office subscriber, battery is reversed on the trunks and loop 408, relay 470 releases and extinguishes lamp 516 as previously described. The attendant now converses with the called party over the previously described talking circuit connected through loop 408 and instructs the called party to hold the connection while she secures the calling party.

To secure the calling P. A. B. X party the attendant operates locking line key Z to close contacts 380 and 383 so that when the dial start key 360 is operated a circuit is completed from ground on the dial start key over contacts 380, DS4 lead, contacts 503 of key P, contacts 423 to battery on the right side of relays 480 and 495 and relay 480 operates. Relay 480 closes contacts 481—486. It will be noticed that if contacts 425 are provided for relay 420 the disconnect key Q should be operated before initiating dialling to the central office to release relay 420. As the P. A. B. X subscriber has disconnected it will not be reoperated. Closing of contacts 481 and 483 completes a circuit through contacts 492 and 494 respectively and the upper winding of relay 495 to the line equipment 6″ to cause finder-selector link 13 to become associated therewith and extend loop 409 to the line relay of the selector. Contacts 482 serve the same purpose as previously described contacts 451 on completion of a talking circuit. Contacts 484 provide a holding circuit for relay 480 and the lower winding of relay 495 over contacts 446 and disconnect key Q. Contacts 485 complete another auxiliary holding circuit for relay 440 over contacts 485, 496 and the key Q. Contacts 486 provide another ground for lamp 514. Relay 495 now operates and opens the just described holding circuit at contacts 496 and at contacts 497 completes a circuit over lamp 515, NA lead and battery through relay 810 to light lamp 515 to notify the attendant she may initiate dialling.

The operator on initiating dialling to reach the P. A. B. X subscriber operates relay 330 from ground on off-normal springs 355 on the first pulse as before described, which in turn operates to complete a circuit from ground on off-normal springs 365, contacts 331, contacts 383 of key Z, DG4 lead, contact 501 of key P to relay 490 which operates to close contacts 491 and 493. A circuit is now completed from one side of loop 409, contacts 483, contacts 493, contacts 506 of key P, D4 lead, contacts 312, dial springs 363, D3 lead, contacts 507 of key P, contacts 491, contacts 481, and the other side of loop 409 for stepping the finder-selector link 13 to seize a connector such as 4. It will be noticed that the original loop through the upper winding of relay 495 is opened at contacts 492 and 494 during the dialling of each digit as relay 490 is operated only while the digit is dialled. This also prevents dial noises from being heard by the called central office subscriber. The connector 4 is operated to complete the connection to the P. A. B. X subscriber in any well-known manner on the dialling of the remainder of the digits corresponding to his number. After the dialling operation, off-normal springs 365 are opened to allow the release of relays 330 and 490 to in turn close contacts 492 and 494 for placing the upper winding of relay 495 in the circuit and it operates to close contacts 497 and relight supervisory lamp 515.

On answer by the called P. A. B. X subscriber, battery is reversed on loop 409 to release polar relay 495 to complete a previously described holding circuit for relay 440 at contacts 496 and to open contacts 497 and open the circuit to lamp 515 and it extinguishes. A talking circuit is established between the two subscribers which includes one side of loop 409, contacts 481, contacts 492, contacts 482, contacts 431, condenser 439, contacts 451, 461, 452 and one side of loop 408 and the other side of loop 409, contacts 483, 494, 433, condenser 439′, contacts 463, 453 and the other side of loop 408. The attendant may monitor the connection by maintaining her plug in jack 370 and key P operated to maintain the monitoring circuit from condenser 439′, contact 505 of key P, R conductor, condenser 371, coil 370′, conductor T, contact 508 and condenser 439. The attendant returns line key Z to normal and releases key P.

If the attendant desired to establish a connection over loop 409 to the central office subscriber, she operates line key Z after securing the desired information from the P. A. B. X subscriber, and he has disconnected, to close contacts 380 and 383. Again attention is called to the fact that if relay 420 is provided with contacts 425, the attendant must first operate key Q to release relay 420. She may now operate the selector as previously described to establish the connection to the central office in a manner similar to that described for establishing a connection to the P. A. B. X subscriber over loop 409. Now to complete the connection to the P. A. B. X subscriber she must return line key Z to normal to close contacts 381 and 382 so that she may seize and operate a finder-selector link over loop 408 as previously described so that she may complete the connection to the P. A. B. X subscriber in a manner similar to that previously described for completing a connection to the central office subscriber over loop 408. Attention of the reader is called to the fact that the attendant may on her own initiative, without having first been signalled, originate calls to either a P. A. B. X subscriber or a central office subscriber over either loop in the manners described.

When the P. A. B. X subscriber disconnects and battery polarity on trunk 409 is returned to normal, relay 495 reoperates to operate its associated contacts to light supervisory lamp 515. Contacts 496 open to open the auxiliary holding circuit for relay 440 and relay 420 if contacts 425 are provided. Simultaneously if the central office subscriber disconnects battery on loop 408 is returned to normal and relay 470 operates to open contacts 471 and release relay 440 and light lamp 516. Release of relay 440 opens the circuits to relay 450 and 480 and the lower winding of relays 470 and 490 and they all release. Relays 450 and 480 on releasing open their respective loops to release the switching equipment associated therewith and lamp 515. If one of the parties does not disconnect or the call is a toll call for which reverse battery is not provided, the attendant now operates disconnect key Q to open the circuits to relay 440, 450, 480 and the lower windings of relays 470 and 495. Relay 440 on releasing closes contacts 442 for placing battery on the C′ lead. Relays 450 and 480 being released extinguishes lamp 514. Relay 495 on releasing opens contacts 497 to extinguish lamp 515.

If the disconnect operation is initiated from the central office and battery is returned to normal on loop 408 to operate relay 470 which operates its associated contacts to light supervisory lamp 516 and opens the first holding circuit for relay 440 which is held operated over contacts 485, 496 and key Q. The attendant, if the P. A. B. X subscriber has not released, operates disconnect key Q to release the aforedescribed relays in the same manner as described. On release of relay 480, the loop 409 to the P. A. B. X subscriber is opened, while on release of relay 450 the loop 408 through relay 470 is opened. Relay 470 on release of course extinguishes lamp 516.

By noticing whether supervisory lamp 515 or 516 is lit during the release operation, the attendant has an indication which party has disconnected. If the attendant then operates the talk key P and converses with the party still on the line instead of disconnect key Q she may find the party that has not disconnected desires to reach another party. The equipment associated with the central office subscriber, who has disconnected, may be released by operation of non-locking release key 345 to operate relays 310 and 330 as previously described to reoperate relay 460 as previously described except that the ground at contacts 311 is used so that the equipment associated with loop 408 may be released as closing of contacts 462 and 464 does not complete a loop while contacts 312 are open. Relays 310 and 330 release after a few moments to in turn release relay 460 as previously described to reestablish the loop 408 to line circuit 6′ and enable the operation of an associated finder-selector link. A call may now be set up over that equipment to another called party in a manner such as described. If it is desirable to release the equipment associated with line 409 so that another P. A. B. X subscriber may be reached, line key Z is operated just before release key 345 to operate relay 490 as previously described except that ground at contacts 311 is used to release the equipment associated with loop 409 by closing contacts 492 and 494 and leaving contacts 312 open to prevent completion of the loop. The operated relays release after a few moments and the loop 409 is again completed for seizing the associated equipment to enable the completion of a connection to another P. A. B. X subscriber over this equipment in a manner previously described. Thus several connections may be set up from one trunk under control of common equipment.

*Night alarm*

Locking key X is operated during such periods of time as when a night alarm is desirable. An incoming call which results in the operation of any of the answer lamps associated with the switchboard equipment will also operate relay 810 as described to close its associated contact 811 and complete a circuit from key X over lead B2, contacts 342, lead B3, lower winding of impedance 820, winding of buzzer operating impedance 830 to battery on the other side of impedance 820 to cause the buzzer to be operated in any well-known manner. The buzzer is operated until the attendant operates the talk key associated with the trunk having its answer lamp lit to operate relay 340 as previously described and open the circuit to buzzer operating impedance 830 at contacts 342. The attendant may now set up a connection in accordance with any of the procedures previously described.

It is understood that although what I have described is the preferred embodiment of my invention that I do not limit myself thereto as this invention is applicable to many varied adaptations.

What is claimed is:

1. A telephone system including a central office, and a private exchange connected thereto, said private exchange including telephone lines, an attendant's position and first switching means operated for automatically extending a connection and a talking loop over said central office connection on an incoming call from said central office through said position to any of said lines in said private exchange, other switching means in said private exchange, a trunk circuit whereby the attendant may be signalled and a talking loop completed to said position when a connection is established to said position on operation of said other switching means by any of said lines, means at said position operated for releasing said first switching means on an incoming call from said central office if said first switching means is operated to a certain position and for signalling the attendant at said position, extending means at said position thereafter effective for enabling said attendant to operate said first switching means for extending a connection and a talking loop from said central office to any of said lines in said private exchange, last switching means in said private exchange, and last at said position including said trunk circuit and part of said extending means for enabling said attendant to operate said last switching means through said trunk circuit to extend a connection and a talking loop from a calling private line through said trunk circuit to a line in said central office if one of said private lines has signalled said position, said last means also effective to extend a connection and a talking loop to one of said lines in said private exchange in case said private line has released said connection to said position, said last connection and talking loop including said central office line, private line and said trunk circuit.

2. In a system such as claimed in claim 1, means at said position operable for intercepting incoming calls from said central office, and means at said position for rendering said intercept means ineffective only if a call has been extended through said position for a predetermined time.

3. A telephone system including a central office, and a private exchange connected thereto, said private exchange including telephone lines, an attendant's position and first switching means whereby a connection and a talking loop may automatically be established over said central office connection on an incoming call from said central office through said position to any of said lines in said private exchange, other switching means for extending a connection in said exchange, a trunk circuit whereby the attendant may be signalled and a talking loop completed when a connection to said position is established on operation of said other switching means by any of said lines, another trunk circuit at said position through which an incoming call from said central office is extended, means associated with said other trunk circuit operated on release of said connection from said central office by said private line for signalling said attendant, extending means at said position including part of said other trunk circuit operable for completing a talking loop from said position to said central office and for operating said first switching means to extend a connection and complete a talking loop through said other trunk circuit from said central office to another line in said private exchange, last switching means in said private exchange and means at said position including said extending trunk circuit and part of said first means for enabling said attendant to operate said last switching means through said first trunk circuit to extend a connection and a talking loop from a calling private line through said first trunk circuit to a line in said central office if one of said private lines has signalled said position, said last means also effective to extend a connection and a talking loop to one of said lines in said private exchange in case said private line has released said connection to said position, said last connection and talking loop including said central office line, private line and said position.

4. A telephone system having a central office, a trunk line and a private exchange linked to said central office over said trunk line, said private exchange including a number of telephone lines, an attendant's position and first switching means for establishing connections, and comprising an incoming trunk circuit at said position normally connected to said trunk line for repeating impulses received thereover for operating said switching means to establish a connection from said central office to one of said lines, means associated with said trunk circuit operated for releasing said switching means if said impulses correspond to a predetermined number and for signalling said position, telephone means at said position thereafter operable for establishing a talking loop to said central office for securing information and for operating said switching means to thereby establish a connection from said central office including said trunk circuit to any of said private lines, other switching means at said exchange, another trunk circuit at said position, means associated with said other trunk circuit for signalling said position if a calling one of said private lines transmits impulses corresponding to a certain number, said telephone means thereafter operable for securing information from said calling private line and for operating said other switching means to disconnect said trunk line from said first trunk circuit and connect it to said other trunk circuit and to establish a connection including said other trunk circuit between said central office and said attendant's position, last switching means in said exchange, and means including said telephone means at said position thereafter operable if said one line has released before completion of a call to said central office for thereafter operating said last switching means to establish a connection between said central office and said calling private line and including said other trunk circuit.

5. In a telephone system including a private branch exchange and a central office exchange, a trunk line connecting said exchange, lines in said private exchange, each line having impulse transmitting means, an operator's position in said private exchange, switching means in said private exchange operated on operation of the impulse transmitting means of a calling line to extend a connection to said position, other switching means operated by impulses received over said trunk line from the central exchange to complete connections from the trunk line to a line in said private exchange, means in said private exchange controlled by the impulses received over the trunk line and operated only when the received impulses correspond to a predetermined number for releasing said other switching means before a connection is completed to a line in said private exchange and for signalling the operator at said operator's position, said switching means thereafter operated under control of said operator at said position to complete a connection to a called line in the private exchange and connect said called line to said trunk line, and means at said operator's position operated for preventing the operation of said other switching means to complete connections from said central office to lines in the private exchange regardless of the number of impulses received over the trunk line and for causing all calls from the central exchange to signal said operator at said position.

6. In a telephone system having a central office including lines, a private exchange and a trunk line extending between said private exchange and said central office, said private exchange including telephone lines, a cordless attendant's position and switching means, a trunk circuit at said attendant's position connected to said trunk line, means for automatically seizing said trunk circuit on a call from a line in said central office, means in said trunk circuit for repeating impulses received over said trunk line from said central office to thereby operate said switching means to automatically establish a connection from said central office line to a line in said private exchange, means at said position and associated with said trunk circuit operated for intercepting a call from a line in said central office, means at said position operable for extending said intercepted call over said switching means to establish a connection to a line in said exchange, said last means thereafter released, and means in said trunk circuit controlled on release of any connection between said calling and called lines for automatically releasing said switching means and said trunk circuit.

7. In a telephone system having a central office, a private exchange and a trunk line extending between said private exchange and said central office, said private exchange including telephone lines, an attendant's position and switch means, a trunk circuit at said attendant's position connected to said trunk line, means for seizing said trunk circuit on a call from said central office and means in said trunk circuit for repeating impulses received over said trunk lines from said central office to thereby operate said switch means to establish a connection from said central office to a line in said private exchange, the improvement comprising means at said position operable for intercepting a call from said central office and for thereafter operating said switch means to complete said call, means in said trunk circuit for rendering said last means ineffective a predetermined time after seizure of said trunk circuit for preventing interception of a call, and means in said trunk circuit operated on release of any completed call for automatically releasing said switch means and said trunk circuit.

8. In a telephone system having a central office, a private exchange and a trunk line extending between said private exchange and said central office, said private exchange including telephone lines, an attendant's position and switching means, a trunk circuit at said attendant's position connected to said trunk line, means for seizing said trunk circuit on a call from said central office, means in said trunk circuit operated on seizure of said trunk circuit for automatically seizing said switching means and for transmitting impulses received over said trunk line from said central office for operating said switching means to establish a connection from said central office to one of said telephone lines in said private exchange, means at said position operated for preventing seizure of said switching means and for thereafter seizing and operating said switching means for establishing a connection from said control office to any of said lines, and means in said trunk circuit operated on automatic seizure of said switching means on a call from said central office for rendering said last means ineffective.

9. In a telephone system having a central office, a private exchange and a trunk line extending between said private exchange and said central office, said private exchange including telephone lines, a cordless attendant's position and switching means, a trunk circuit at said attendant's position connected to said trunk line, means in said trunk circuit for repeating impulses received over said trunk line on a call from said central office for operating said switching means to automatically establish a connection from said central office to one of said telephone lines in said private exchange, a signal at said attendant's position, means associated with said trunk circuit operated on release of said connection by said one telephone line for operating said signal, and means at said position including said trunk circuit operative for releasing said switching means and for thereafter reoperating said switching means to establish a connection from said central office to another one of said lines.

10. In a system such as claimed in claim 9, means automatically operated for releasing said switching means and said trunk circuit on termination of said last connection.

11. In a telephone system having a central office, a private exchange and a trunk line extending between said private exchange and said central office, said private exchange including a telephone line having an impulsing device, an attendant's position and a plurality of automatic switching elements, a trunk circuit at said attendant's position, a signed at said position, means for operating said signal when one of said switching elements is operated to a predetermined position in accordance with the operation of said impulsing device on a call from said line for establishing a connection to said position, means at said position operated for completing a talking loop to said line to secure information, means associated with said trunk circuit operated for operating other of said switching elements to establish a connection including said trunk line to said central office independent of the maintenance of said first connection, means at said position thereafter operated for establishing a connection and a talking loop between said line and said central office through said trunk circuit, said means associated with said trunk circuit also operated for operating different ones of said switching elements to establish a connection and a talking loop between said line and said central office including said trunk circuit in case said first connection to said position from said line was not maintained.

12. In a telephone system having a central office, a private exchange and a trunk line extending between said private exchange and said central office, said private exchange including a telephone line having an impulsing device, a cordless attendant's position and automatic switching means, a trunk circuit at said attendant's position, a signal at said position, means operated if said switching means is operated to a predetermined position in accordance with the operation of said impulsing means on a call initiated from said telephone line for establishing a connection to said position, means operated by said operated last means for operating said signal for signalling the attendant, key means at said position operated for completing a talking loop to said line, other switch means, an impulsing device at said position for operating said other switch means to a position for establishing a connection and a second talking loop including said trunk circuit over said trunk line to said central office and to a line in said central office, said second talking loop including said first switch means and said telephone line, and means controlled solely by the calling and called lines if said key means are released for automatically releasing all of said switching means and said trunk circuit.

13. In a telephone system having a central office, a private exchange and a trunk line extending between said private exchange and said central office, said private exchange including telephone lines, an attendant's position and switching means, a trunk circuit at said attendant's position connected to said trunk line, means in said trunk circuit for repeating impulses received over said trunk line from said central office on a call from said central office for operating said switching means to establish a connection and a talking loop to one of said telephone lines in said private exchange, a signal at said position, means associated with said trunk circuit operated if said switching means is operated to a predetermined position for releasing said switching means and for operating said signal, and means including said trunk circuit at said position operated for reoperating said switching means for establishing a connection to any of said lines.

14. In a system such as claimed in claim 13, means controlled solely on release of said call by said calling central office for releasing said switching means and said trunk circuit if said last means are unoperated.

References Cited in the file of this patent

UNITED STATES PATENTS

| | | |
|---|---|---|
| 2,289,895 | Abbott | July 14, 1942 |
| 2,304,220 | Waller | Dec. 8, 1942 |
| 2,424,563 | Gohorel | July 29, 1947 |
| 2,496,902 | Voss | Feb. 7, 1950 |